US008116261B2

(12) United States Patent
Kamada et al.

(10) Patent No.: US 8,116,261 B2
(45) Date of Patent: Feb. 14, 2012

(54) MESSAGE DISPLAY TERMINAL, GATEWAY SERVER, PROGRAM FOR MESSAGE DISPLAY TERMINAL, AND PROGRAM FOR GATEWAY SERVER

(75) Inventors: Tomihisa Kamada, Tokyo (JP);
Kazumasa Fueki, Yokohama (JP);
Tomonori Watanabe, Tokyo (JP);
Akihito Monta, Kakogawa (JP);
Toshihiko Fukuda, Madrid (ES)

(73) Assignee: Access Co., Ltd., Tokyo (JP)

( * ) Notice: Subject to any disclaimer, the term of this patent is extended or adjusted under 35 U.S.C. 154(b) by 1135 days.

(21) Appl. No.: 10/572,248

(22) PCT Filed: Sep. 17, 2004

(86) PCT No.: PCT/JP2004/013639
§ 371 (c)(1),
(2), (4) Date: Mar. 13, 2007

(87) PCT Pub. No.: WO2005/029339
PCT Pub. Date: Mar. 31, 2005

(65) Prior Publication Data
US 2007/0298842 A1 Dec. 27, 2007

(30) Foreign Application Priority Data
Sep. 19, 2003 (JP) ................................. 2003-328903

(51) Int. Cl.
*H04W 4/00* (2009.01)
(52) U.S. Cl. ................. 370/328; 455/414.2; 455/556.2; 709/203; 709/235; 705/14.14; 717/108

(58) Field of Classification Search .................. 455/566; 370/328
See application file for complete search history.

(56) References Cited

U.S. PATENT DOCUMENTS

| 6,157,946 A | 12/2000 | Itakura et al. |
| 6,351,745 B1 | 2/2002 | Itakura et al. |
| 6,470,381 B2 | 10/2002 | De Boor et al. |
| 6,639,608 B1 | 10/2003 | Itakura |
| 6,978,312 B2 * | 12/2005 | Eydelman et al. ............ 709/235 |
| 6,987,987 B1 * | 1/2006 | Vacanti et al. ............ 455/556.2 |
| 7,739,658 B2 * | 6/2010 | Watson et al. ................ 717/108 |
| 2002/0040388 A1 | 4/2002 | Ternullo et al. |
| 2002/0095407 A1 | 7/2002 | Itakura et al. |
| 2002/0120503 A1 | 8/2002 | Iwayama et al. |
| 2003/0093315 A1 * | 5/2003 | Sato ............................... 705/14 |

(Continued)

FOREIGN PATENT DOCUMENTS
EP 0953901 A2 11/1999
(Continued)

OTHER PUBLICATIONS

International Search Report mailed Dec. 28, 2004, for PCT Application No. PCT/JP2004/013639 filed Sep. 17, 2004, 4 pages.

(Continued)

*Primary Examiner* — Nick Corsaro
*Assistant Examiner* — Gerald Johnson
(74) *Attorney, Agent, or Firm* — Morrison & Foerster LLP

(57) ABSTRACT

A message display terminal for displaying content existing on a network comprises reception means which receives an HTTP response message, a first display area for displaying a message body, a second display area for displaying other information, and display control means which lets the second display area display advertisement data.

16 Claims, 6 Drawing Sheets

U.S. PATENT DOCUMENTS

| | | |
|---|---|---|
| 2003/0153363 A1 | 8/2003 | Kuwazoe |
| 2004/0049519 A1 | 3/2004 | Itakura et al. |
| 2004/0088349 A1* | 5/2004 | Beck et al. ............ 709/203 |
| 2004/0201616 A1 | 10/2004 | Itakura et al. |
| 2004/0248561 A1* | 12/2004 | Nykanen et al. ........ 455/414.2 |

FOREIGN PATENT DOCUMENTS

| | | |
|---|---|---|
| EP | 1100269 A1 | 5/2001 |
| JP | 2000-348065 A | 12/2000 |
| JP | P2001-043282 | 2/2001 |
| JP | 2001-309443 A | 11/2001 |
| JP | P2001-306922 | 11/2001 |
| JP | 2002-24276 A | 1/2002 |
| JP | P2002-007243 | 1/2002 |
| JP | 2002-49840 A | 2/2002 |
| JP | P2002-064560 | 2/2002 |
| JP | P2002-183024 | 6/2002 |
| JP | 2002-197343 A | 7/2002 |
| JP | P2002-203119 | 7/2002 |
| JP | 2002-304347 A | 10/2002 |
| JP | 2002-351781 A | 12/2002 |
| JP | 2003-174467 A | 6/2003 |
| JP | 2003-209609 A | 7/2003 |
| JP | 2003-218998 A | 7/2003 |
| JP | 2003-233437 A | 8/2003 |
| JP | 2003-259323 A | 9/2003 |
| WO | WO-97/27531 A1 | 7/1997 |
| WO | WO-01/80019 A1 | 10/2001 |

OTHER PUBLICATIONS

Supplementary European Search Report mailed May 2, 2008, for EP Application No. 04773274.8 filed Sep. 17, 2004, 3 pages.

Japanese Office Action mailed Mar. 5, 2009, for JP Application No. 2003-328903, 2 pages, (English translation attached, 2 pages).

Japanese Office Action mailed Jul. 15, 2009, for JP Application No. 2003-328903, 4 pages. (English translation attached, 3 pages).

Ota, K., (Feb. 10, 2001). "Advertisement Service for mobile phones—sales promotion tools for oyayubizoku-," *Nikkei Net Business*, Japan.

Office Action issued by the European Patent Office Oct. 15, 2010 in Application No. EP 04773274, 8 pages.

* cited by examiner

MESSAGE DISPLAY TERMINAL, GATEWAY SERVER, PROGRAM FOR MESSAGE DISPLAY TERMINAL, AND PROGRAM FOR GATEWAY SERVER

CROSS REFERENCE TO RELATED APPLICATIONS

This application is a 35 U.S.C. §371 National Stage filing of International Patent Application No. PCT/JP2004/013639, filed Sep. 17, 2004, titled MESSAGE DISPLAY TERMINAL, GATEWAY SERVER, PROGRAM FOR MESSAGE DISPLAY TERMINAL, AND PROGRAM FOR GATEWAY SERVER, which claims the benefit of Japanese Application No. 2003-328903, titled MESSAGE DISPLAY TERMINAL, GATEWAY SERVER, PROGRAM FOR MESSAGE DISPLAY TERMINAL, AND PROGRAM FOR GATEWAY SERVER, filed Sep. 19, 2003, both of which are incorporated herein by reference in their entireties.

TECHNICAL FIELD

The present invention relates to a message display terminal which acquires content existing on a network such as the Internet and displays the acquired content, and a gateway server which relays the content to the terminal while adding an advertisement to the content. The present invention relates also to programs executed by the message display terminal and the gateway server.

BACKGROUND OF THE INVENTION

In recent years, message display terminals capable of receiving content (e.g. Web page) existing on the Internet are widely used. Advertisement delivery of the push type, employing such message display terminals, is attracting increasing attention today as a new advertising method.

Advertisement delivery systems that deliver advertisements by such a method include, for example, systems described in Japanese Patent Provisional Publication No. 2001-43282 (patent document #1) and Japanese Patent Provisional Publication No. 2002-64560 (patent document #2). In the techniques of the above documents, communication between a mobile terminal (as the message display terminal) and a base station is executed by wireless packet communication, while a gateway is placed between the base station and a content server on the Internet. The gateway server receiving an HTTP request message from the base station executes a protocol conversion (into TCP/IP) to the received HTTP request message, and sends the converted message to the content server. An HTTP response message including content is sent to the base station and to the mobile terminal via the gateway server in a similar manner. By such protocol conversion between the Internet and the packet communication network for the mobile terminals, the browsing of Internet content on the mobile terminals is made possible.

Each of the advertisement delivery systems disclosed in the above documents employs a gateway. Specifically, an advertisement is displayed on the screen of a mobile terminal by adding the advertisement to content data which is transmitted from a content server on the Internet. Such advertisements are the so-called "banner advertisements". In a character string or an image (hereinafter collectively called a "banner") placed at the front end (or rear end) of the content data, an anchor for a hyperlink to a resource existing on the Internet is set. Such resources generally include detailed advertisements and online shopping sites. The user of a mobile terminal can let the mobile terminal display such a resource (represented by a hyperlink set in a banner) on its screen by properly operating the mobile terminal.

DISCLOSURE OF THE INVENTION

Problems to be Solved by the Invention

The above systems are advantageous in that the provider of the wireless packet communication network can deliver such advertisements on its own. However, in the techniques of the above documents inserting advertisements in the content data itself, the type of the content (into which the advertisements can be inserted) is restricted to hypertext documents such as HTML documents. Further, since the gateway server alters the content itself (adds the advertisements to the content), the original layout of the content can get out of shape and readability of the content itself can be deteriorated seriously.

In many cases, such content is very large and can not be displayed on the screen of a mobile terminal all at once. In such cases, the user of the mobile terminal browses the content by scrolling the content with respect to the screen. However, when the banners are scrolled out of the screen, such banners do not function as advertisements any more.

Means for Solving the Problems

In order to resolve the above problems, a message display terminal provided by an aspect of the present invention comprises reception means which receives an HTTP response message, a first display area for displaying a message body of the HTTP response message, a second display area for displaying other information, and display control means which lets the second display area display advertisement data contained in the HTTP response message.

By the message display terminal configured as above, the advertisement and content stored in the message body of the HTTP response message can be displayed in separate areas. Therefore, even when the user scrolls the content on the screen in order to browse the content, the advertisement displayed in the second display area remains being displayed in the second display area. Further, the layout of the content itself is not broken at all by the advertisement since the advertisement is displayed separately from the content.

The advertisement displayed in the second display area can either be a character string or an image, or both of them. The so-called marquee display, scrolling a character string in the second display area, is also possible.

The second display area may be configured to include a first area for displaying image data and a second area for displaying a character string. With such a configuration, both a character string and an image can be displayed simultaneously and separately.

When no advertisement data is displayed in the second display area, the second display area may display prescribed information. With such a configuration, it becomes possible to display, for example, the name and logotype of the manufacturer of the message display terminal in the second display area when no advertisement is displayed.

The display control means may include: menu display means for displaying an operation menu for letting a user of the message display terminal operate the message display terminal; and menu control means which lets the operation menu show a menu item, for selecting whether to let the first display area display a resource represented by a URI contained in the advertisement data or not, when such an URI representing the position of the resource on a network is contained in the advertisement data.

With such a configuration, the user of the message display terminal can let the first display area display the resource represented by the URI contained in the advertisement data by operating the menu. The resource can be a Web page describing the details of the advertisement, for example.

In accordance with another aspect of the present invention, there is provided a gateway server (relaying an HTTP request message sent from a terminal on a first network to a content server on a second network while relaying an HTTP response message sent from the content server to the terminal) which adds advertisement data to a header part of the HTTP response message before sending the HTTP response message to the terminal.

With such a configuration, the administrator of the first network (e.g. a wireless packet communication network) is allowed to add an advertisement to a resource on the second network (e.g. the Internet). Further, the advertisement can be added to a resource other than a hypertext document.

The gateway server may comprise advertisement selecting means which selects advertisement data to be added to the header part of the HTTP response message from multiple pieces of advertisement data. With such a configuration, it becomes possible to select a proper advertisement depending on the user of the terminal, the contents of the resource, the installation location of the terminal, etc.

Incidentally, the advertisement data may contain data obtained by text-encoding (e.g. encoded image data obtained by text-encoding image data). The advertisement data may contain a URI representing the position of a prescribed resource on the second network.

Figure 1:
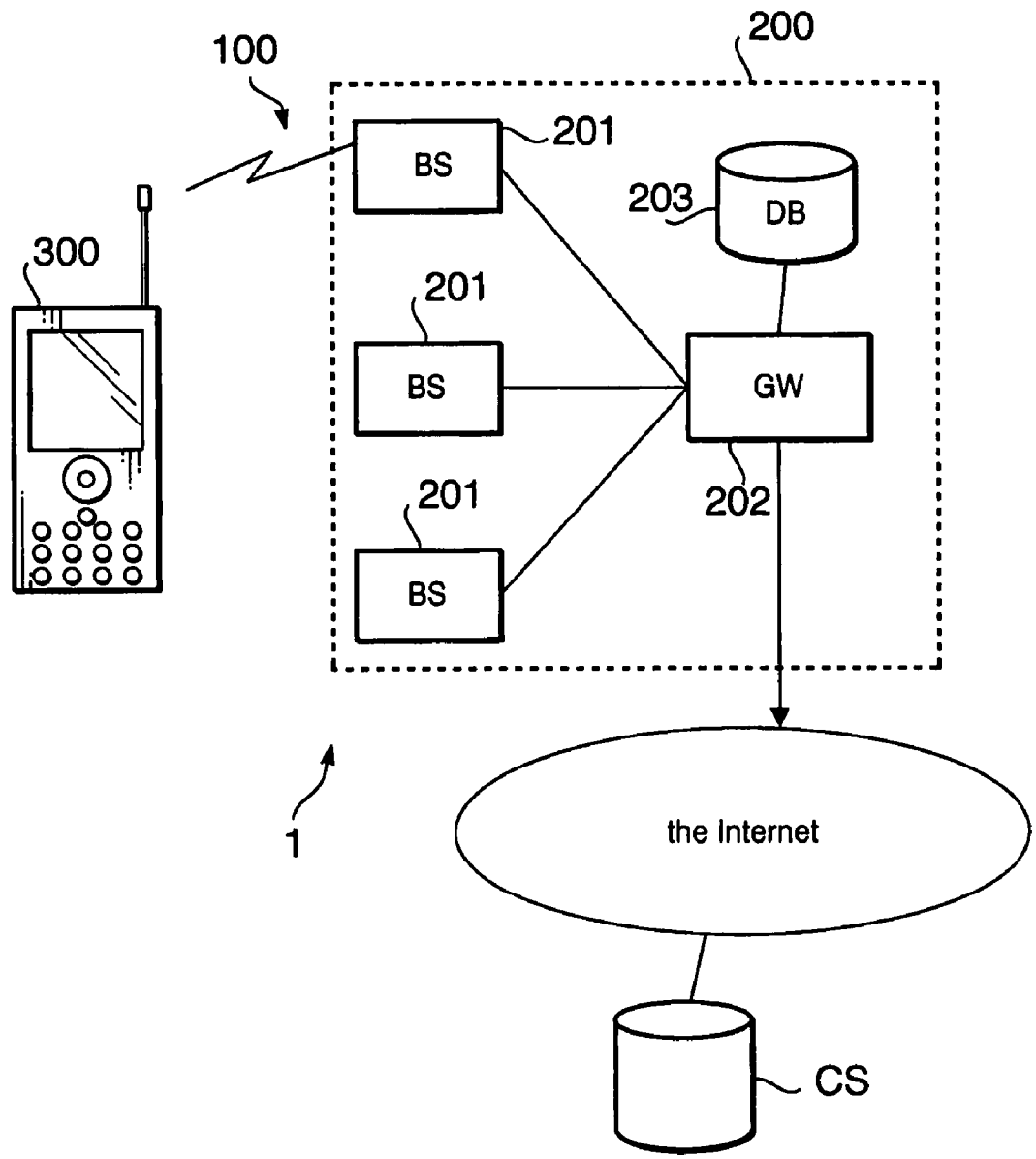
FIG. 1 is a conceptual diagram showing an advertisement information delivery system in accordance with an embodiment of the present invention.

DESCRIPTION OF REFERENCE CHARACTERS 1 advertisement information delivery system
100 wireless packet communication network
200 packet communication facilities
201 base station
202 gateway server
203 database server
300 cellular phone
301 screen
301a main display area
301b advertisement character string display area
301c advertisement image display area
302 operation key unit
302a cross-shaped directional key
302b execution key
302c menu display key

BEST MODE FOR CARRYING OUT THE INVENTION

Referring now to the drawings, a description will be given in detail of a preferred embodiment in accordance with the present invention. FIG. 1 is a conceptual diagram showing an advertisement information delivery system in accordance with an embodiment of the present invention.

The advertisement information delivery system 1 includes packet communication facilities 200 which provides a wireless packet communication network 100 and a cellular phone 300 as a message display terminal. The cellular phone 300 is provided with an LCD monitor 301 capable of displaying content data of prescribed formats (HTML documents, still images, video images, etc.) and an operation unit 302 to be operated for acquiring content data, etc. (see FIG. 5).

The cellular phone 300 makes access to a base station 201 of the packet communication facilities 200 via the wireless packet communication network 100. The packet communication facilities 200 includes a plurality of (three in the example of FIG. 1) base stations 201. Each base station 201 transmits and receives packets to/from cellular phones existing in an area (cellular) of a prescribed size around the base station.

Each base station 201 is connected to a gateway server 202 by a cable. Incidentally, while all the base stations 201 are directly connected to the gateway server 202 in this embodiment, it is possible to prepare two or more gateway servers in order to disperse the load. It is also possible to add a relaying server between a base station 201 and the gateway server 202.

The gateway server 202 is capable of communicating with each base station 201 via a cable, while being capable of communicating with any content server CS connected to the Internet. The gateway server 202 receives data packets according to a protocol employed in the packet communication network from a base station 201, executes a protocol conversion (into TCP/IP employed in the Internet) to the received data packets, and transmits the converted data packets to a content server CS. Similarly, the gateway server 202 receives data packets according to TCP/IP from a content server CS, executes a protocol conversion (into the protocol for the packet communication network) to the received data packets, and transmits the converted data packets to a base station 201.

By the above configuration, the cellular phone 300 and the content server CS are allowed to execute data transmission/reception according to a prescribed session layer protocol (e.g. HTTP (HyperText Transport Protocol)). A procedure of data transmission/reception according to HTTP will be explained later.

The gateway server 202 of this embodiment, receiving an HTTP response message including content data from the content server CS, is capable of adding advertisement data to the header part of the response message and transmitting such a response message to the cellular phone 300. Such a configuration will be explained below.

Figure 2:
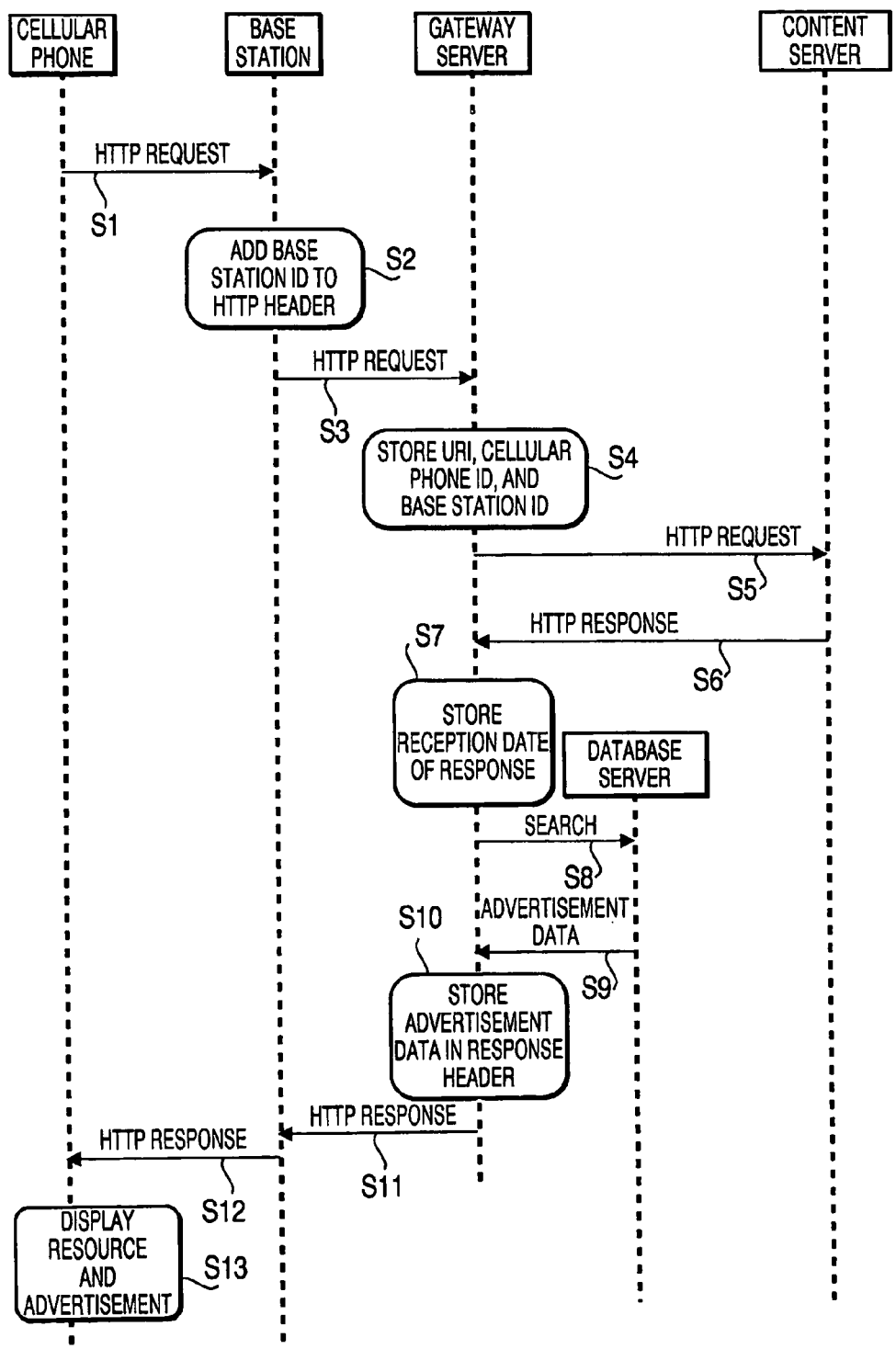
FIG. 2 is a time chart showing a process which is executed in the embodiment when a cellular phone acquires content data.

FIG. 2 is a time chart showing a process which is executed when the cellular phone 300 acquires content data.

When the cellular phone 300 tries to acquire content data from a content server CS, the cellular phone 300 transmits an HTTP request message to a base station 201 (S1). The HTTP request message is a message defined in Chapter 5 of RFC2616 "Hypertext Transfer Protocol—HTTP/1.1", which is used for requesting a resource (content) of a content server CS. The structure of the HTTP request message is shown in FIG. 3.

Figure 3:
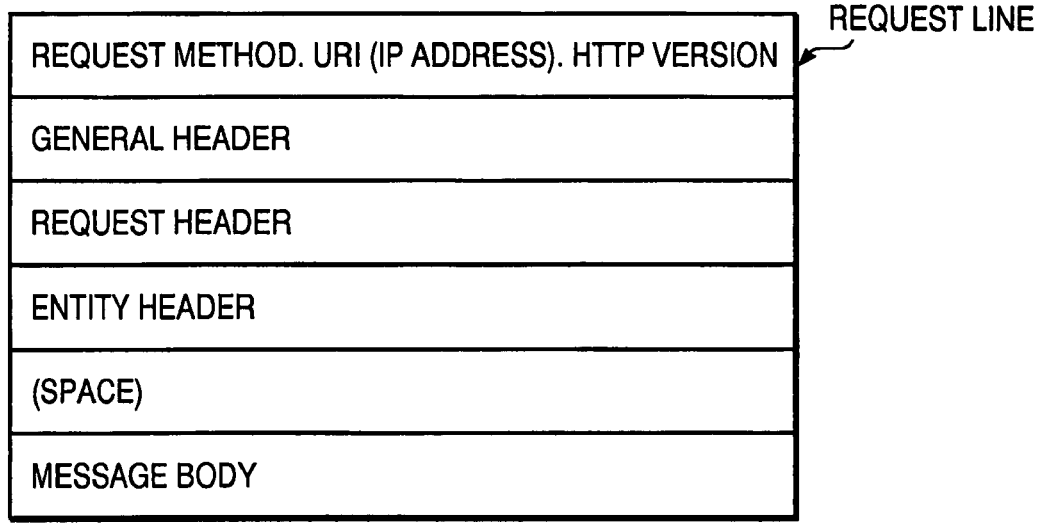
FIG. 3 shows the structure of an HTTP request message.

As shown in FIG. 3, the HTTP request message includes a "request line", a "general header", a "request header", an "entity header" and a "message body". Generally, the "request line", "general header", "request header" and "entity header" are collectively called "HTTP request header". The "request line" includes three pieces of data: "request method", "URI" and "HTTP version".

The "request method" is a sort of command for specifying a process to be executed by the content server CS. The "URI" is the URI of a resource as the target of the process. For example, when the cellular phone is requesting a resource at a URI "some.domain/index.html", data "GET" is stored in the "request method" and data "some.domain/index.html" is stored in the "URI". The "HTTP version" represents the version of HTTP employed by the cellular phone.

In the "general header", data used both in the HTTP request message and in a response message (explained later) is stored. The "message body", for storing data of a prescribed format, is used when the cellular phone sends data to the content server, for example.

In the "entity header", information on the message body, such as the media type and the data length of the "message body", is stored. Incidentally, the "entity header" can store data that are not specified in HTTP1.1.

The cellular phone 300 trying to acquire content data from a content server CS transmits an HTTP request message, storing "GET" in the "request method", the URI of the resource in the "URI", and a cellular phone ID (as identification information on the cellular phone 300) in the "entity header", to a base station 201.

Upon reception of the HTTP request message from the cellular phone 300, the base station 201 adds a base station ID (as information for identifying the base station 201) to the entity header of the HTTP request message as shown in FIG. 2 (S2). Subsequently, the base station 201 transfers the HTTP request message to the gateway server 202 (S3).

The gateway server 202 receiving the HTTP request message from the base station 201 extracts the cellular phone ID, the base station ID and the URI from the entity header and the request line of the HTTP request message respectively, and stores the extracted data in its own memory (unshown) (S4). Subsequently, the gateway server 202 transmits the HTTP request message to a content server CS that is identified by the URI in the request line (S5). Incidentally, the cellular phone ID and the base station ID are deleted from the HTTP request message before the transmission since the cellular phone ID is a sort of personal information and the base station ID is facilities information on the packet communication facilities.

The content server CS receiving the HTTP request message generates an HTTP response message containing data of the resource corresponding to the URI stored in the "URI" of the request line of the received HTTP request message, and transmits the HTTP response message to the gateway server 202 (S6). The HTTP response message is a message defined in Chapter 6 of RFC2616, which is used as a response to the received request message. The structure of the HTTP response message is shown in FIG. 4.

Figure 4:
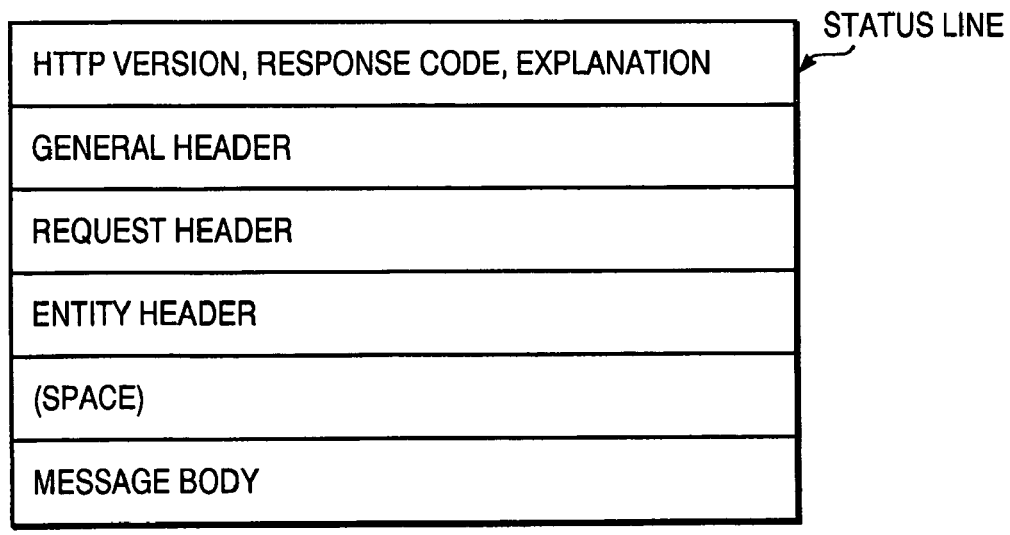
FIG. 4 shows the structure of an HTTP response message.

As shown in FIG. 4, the HTTP response message includes a "status line", a "general header", a "response header", an "entity header" and a "message body". Generally, the "status line", "general header", "response header" and "entity header" are collectively called "HTTP response header". The "status line" includes three pieces of data: "HTTP version", "response code" and "explanation".

The "HTTP version" represents the version of HTTP employed by the content server CS. The "response code" is a three-digit number indicating the result of response to the request. For example, when the requested resource is sent back by the response message in response to the request, the response code represents a value "200". When no resource specified by the "URI" in the request line of the request message exists in the content server, the response code represents a value "404". The "explanation" is an English explanation of the response code. For example, the "explanation" for the response code 404 is "Not Found".

The functions of the "general header" and "entity header" are identical with those of the "general header" and "entity header" of the HTTP request message, and thus repeated explanation thereof is omitted here. The "entity header" can store data that are not specified in HTTP1.1. In an HTTP response message in response to an HTTP request message containing the "GET" request method, the resource specified by the URI designated by the HTTP request message is stored in the "message body".

Upon reception of the HTTP response message from the content server CS, the gateway server 202 stores the date and time of the reception of the HTTP response message in its own memory (unshown) as shown in FIG. 2 (S7). The gateway server 202 may also be configured to store the date and time of the reception of the request message in the step S4, instead of storing the date and time of the reception of the response message.

Subsequently, the gateway server 202 makes access to a database server 203 (FIG. 1) by use of part or all of the data stored in the steps S4 and S7 (hereinafter referred to as "search data") (S8).

The database server 203 is a server storing multiple pieces of advertisement data. In the database server 203, a keyword data table, in which one or more search keywords have been linked with each piece of advertisement data, has been formed. A personal information data table, to be used for referring to personal information (e.g. sex, hobby and age) on the user of the cellular phone (identified by the cellular phone ID) by use of the cellular phone ID, has also been constructed in the database server 203. Further, a base station information data table to be used for referring to position information (e.g. prefecture in which a base station is placed) on the base station (identified by the base station ID) by use of the base station ID has also been constructed in the database server 203. Furthermore, a URI data table to be used for extracting a search keyword based on a URI has also been formed in the database server 203. For example, when a URI represents a Web page that handles topics about a particular sport, the name of the particular sport can be extracted as a keyword based on the URI.

For example, when a cellular phone ID is sent from the gateway server 202 to the database server 203, the database server 203 refers to the personal information data table and thereby extracts the personal information on the user of the cellular phone. Subsequently, the database server 203 refers to the keyword data table by use of the personal information and searches for advertisement data having part of all of the personal information as a keyword. For example, when the personal information indicates that the owner of the cellular phone is a male in his 30s, the database server 203 extracts advertisement data that are "suitable for men in their 30s". The extracted advertisement data are sent to the gateway server 202.

As above, by sending the cellular phone ID to the database server 203, the gateway server 202 can acquire effective advertisements, suitable for the sex, age and hobby of the user of the cellular phone identified by the cellular phone ID.

Meanwhile, when a base station ID is sent from the gateway server 202 to the database server 203, for example, the database server 203 refers to the base station information data table and thereby extracts the position information on the base station identified by the base station ID (that is, position information on the cellular phone communicating with the base station). Subsequently, the database server 203 refers to the keyword data table by use of the position information and searches for advertisement data having part of all of the position information as a keyword. For example, when the position information indicates that the cellular phone is in Tokyo, the database server 203 extracts advertisement data that are "related to Tokyo" (e.g. advertisement data related to events being held in Tokyo). The extracted advertisement data are sent to the gateway server 202.

As above, by sending the base station ID to the database server 203, the gateway server 202 can acquire effective advertisements, suitable for the position of the cellular phone transmitting the HTTP request message.

Meanwhile, when a URI is sent from the gateway server 202 to the database server 203, for example, the database server 203 refers to the URI data table and thereby extracts the keyword related to the URI. Subsequently, the database server 203 refers to the keyword data table by use of the keyword and searches for advertisement data containing the keyword. For example, when the URI represents a Web page that handles topics about a particular sport, the database server 203 extracts advertisement data that are related to the particular sport. The extracted advertisement data are sent to the gateway server 202.

As above, by sending the URI to the database server 203, the gateway server 202 can acquire effective advertisements, suitable for the content that the user of the cellular phone is going to browse, that is, related to an area or field in which the user of the cellular phone is currently interested.

Meanwhile, when the date and time of the reception of the HTTP response message is sent from the gateway server 202 to the database server 203, for example, the database server 203 refers to the keyword data table by use of the reception date/time and searches for advertisement data having the reception date/time as a keyword. For example, the database server 203 extracts advertisement data that are related to events, TV programs, etc. within a prescribed period from the reception date/time (i.e. current date/time). The extracted advertisement data are sent to the gateway server 202.

As above, by sending the reception date/time of the HTTP response message to the database server 203, the gateway server 202 can acquire advertisement data of advertisements that should be published at the current date/time.

The various advertisement extraction means which have been explained above may be combined arbitrarily. For example, by sending both the base station ID and the reception date/time of the HTTP response message to the database server 203, advertisement data of advertisements that are related to events being currently held in the vicinity of the current position of the cellular phone can be extracted, for example.

The database server 203 transmits the advertisement data to the gateway server 202 as explained above (S9 in FIG. 2). The gateway server 202 receiving the advertisement data from the database server 203 stores the advertisement data in the entity header of the HTTP response message (S10). When multiple pieces of advertisement data are supplied from the database server 203 for one HTTP response header, the gateway server 202 randomly selects a piece of advertisement data from the multiple pieces of advertisement data. Subsequently, the gateway server 202 transmits the HTTP response message containing the advertisement data to the base station 201 (S11). Incidentally, while the gateway server 202 makes access to the database server in this embodiment, it is also possible to let a different device forming the wireless packet communication network (e.g. base station 201) make access to the database server 203 and add the advertisement data to the HTTP response header.

Upon reception of the HTTP response message, the base station 201 transmits the HTTP response message to the cellular phone 300 (S12).

Subsequently, the cellular phone 300 extracts the resource from the message body of the HTTP response message and displays the resource on its screen, while also displaying advertisement data on the screen if the advertisement data is contained in the entity header of the HTTP response message (S13).

By the process explained above, suitable advertisement data is displayed on the screen of the cellular phone 300. Incidentally, a process for the displaying of the resource and the advertisement data will be explained later.

In the step S8, the gateway server 202 obtains the media type of the resource contained in the HTTP response message from the entity header of the response message and judges whether or not to make access to the database server 203 based on the media type. For example, when the resource is image data, the image has a possibility of being read into an HTML document as an inline image. Such a resource like an inline image is requested by the browser of the cellular phone 300 immediately after an HTTP response header containing the HTML document is loaded in the cellular phone 300. Therefore, if advertisement data is contained in the HTTP response message containing an inline image, advertisement data already displayed together with the HTML document is overwritten with the new advertisement data when the inline image is displayed. Consequently, the advertisement data supplied together with the HTML document is displayed only for a very short time. To avoid the problem, the gateway server 202 in this embodiment is configured to make access to the database server 203 only when the media type of the resource contained in the HTTP response message is "Text".

Next, an advertisement data displaying method employed by the cellular phone 300 will be explained.

First, data structure of the advertisement data in this embodiment will be explained. The advertisement data is text data extending for at least two lines partitioned by line feed codes (CR+LF). Each line forming the advertisement data is described in a format of "identifier:data". The identifier is data for informing the cellular phone what the following data represents. In this embodiment, four types of identifiers: "X-VE-BannerText", "X-VE-BannerImageData", "X-VE-BannerImageURI" and "X-VE-URI" have been defined.

When the identifier is "X-VE-BannerText", the data following the identifier is a character string having a meaning as an advertisement. When the identifier is "X-VE-BannerImageData", the data following the identifier is data obtained by text-encoding image data of a prescribed format by means of base64, etc. When the identifier is "X-VE-BannerImageURI", the data following the identifier is a URI representing image data placed at a particular site on the Internet. Incidentally, such image data may either be data of a still image or data of video images or animation. When the identifier is "X-VE-URI", the data following the identifier is a URI representing a resource on the Internet describing a detailed explanation of the advertisement.

Figure 5:
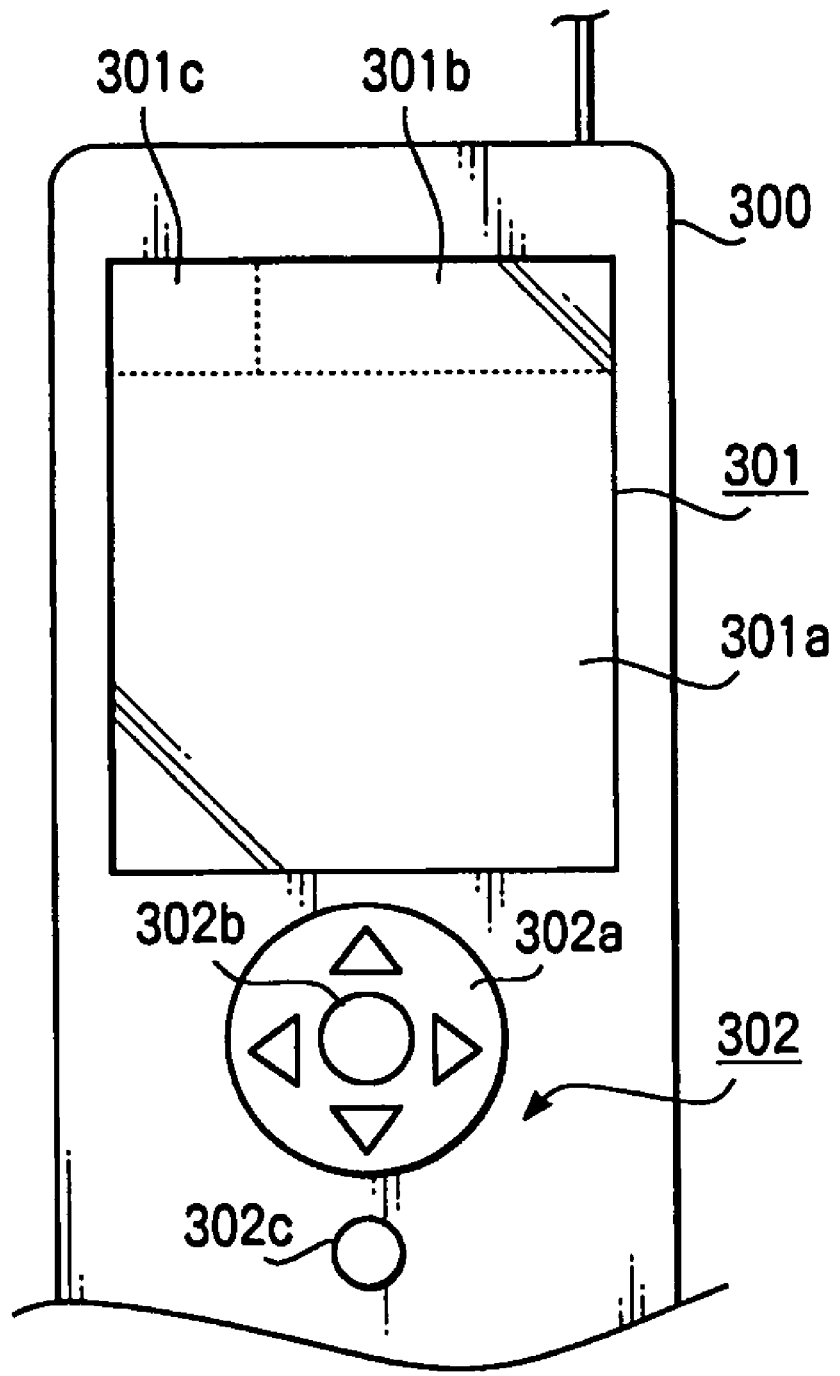
FIG. 5 is a schematic diagram showing a screen and an operation key unit of the cellular phone of the embodiment.

Next, the detailed composition of the cellular phone 300 in this embodiment will be explained. FIG. 5 is a schematic diagram showing the screen and an operation key unit of the cellular phone 300 of this embodiment.

On the screen 301 of the cellular phone 300, a main display area 301a for mainly displaying the resource contained in the message body of the HTTP response message, an advertisement character string display area 301b for displaying an advertisement as a character string, and an advertisement image display area 301c for displaying an advertisement as an image have been defined. As shown in FIG. 5, the advertisement image display area 301c is placed at the left end of an area of the screen 301 corresponding to the uppermost line, while the advertisement character string display area 301b is placed on the right-hand side of the advertisement image display area 301c to occupy most of the area of the screen 301 corresponding to the uppermost line. An area occupying most of the screen 301, that is not the advertisement image display area 301c nor the advertisement character string display area 301b, is the main display area 301a. When no advertisement is displayed in the advertisement character string display area 301b nor the advertisement image display area 301c, prescribed information, such as the name and logotype of the manufacturer of the cellular phone 300, is displayed in the areas.

The operation key unit 302 of the cellular phone 300 includes a cross-shaped directional key 302a, an execution key 302b and a menu display key 302c. The functions of the keys will be explained later.

As mentioned above, the resource contained in the message body of the HTTP response message is displayed in the main display area 301a. When the resource is larger than the main display area 301a, only a part of the resource is displayed. The user of the cellular phone 300 can scroll the resource in the main display area 301a by operating the cross-shaped directional key 302a so that a desired part of the resource will be displayed in the main display area 301a. Incidentally, even when the resource is larger than the main display area 301a as above, the resource is displayed in the main display area 301a only, not in the advertisement character string display area 301b nor the advertisement image display area 301c. In other words, the advertisement data remains being displayed in the advertisement character string display area 301b and/or the advertisement image display area 301c even when the resource is scrolled.

When the resource is a hypertext document in which anchors for links have been embedded (e.g. HTML document including anchor elements), the user of the cellular phone 300 can point at an arbitrary anchor by operating the cross-shaped directional key 302a. When the execution key 302b is pressed by the user after pointing at an anchor, the cellular phone 300 generates an HTTP request message for requesting a resource represented by an URI contained in the anchor, and transmits the HTTP request message to a base station 201.

When an HTTP response message is received from the base station 201 (FIG. 1), the cellular phone 300 analyzes the message and thereby extracts the "resource contained in the message body", the "media type of the resource contained in the entity header" and the "advertisement data contained in the entity header" from the response message. The "resource contained in the message body" is displayed in the main display area by a display method corresponding to the media type of the resource.

Meanwhile, the advertisement data contained in the entity header is displayed in the advertisement character string display area 301b and/or the advertisement image display area 301c. The process will be explained below.

Figure 6:
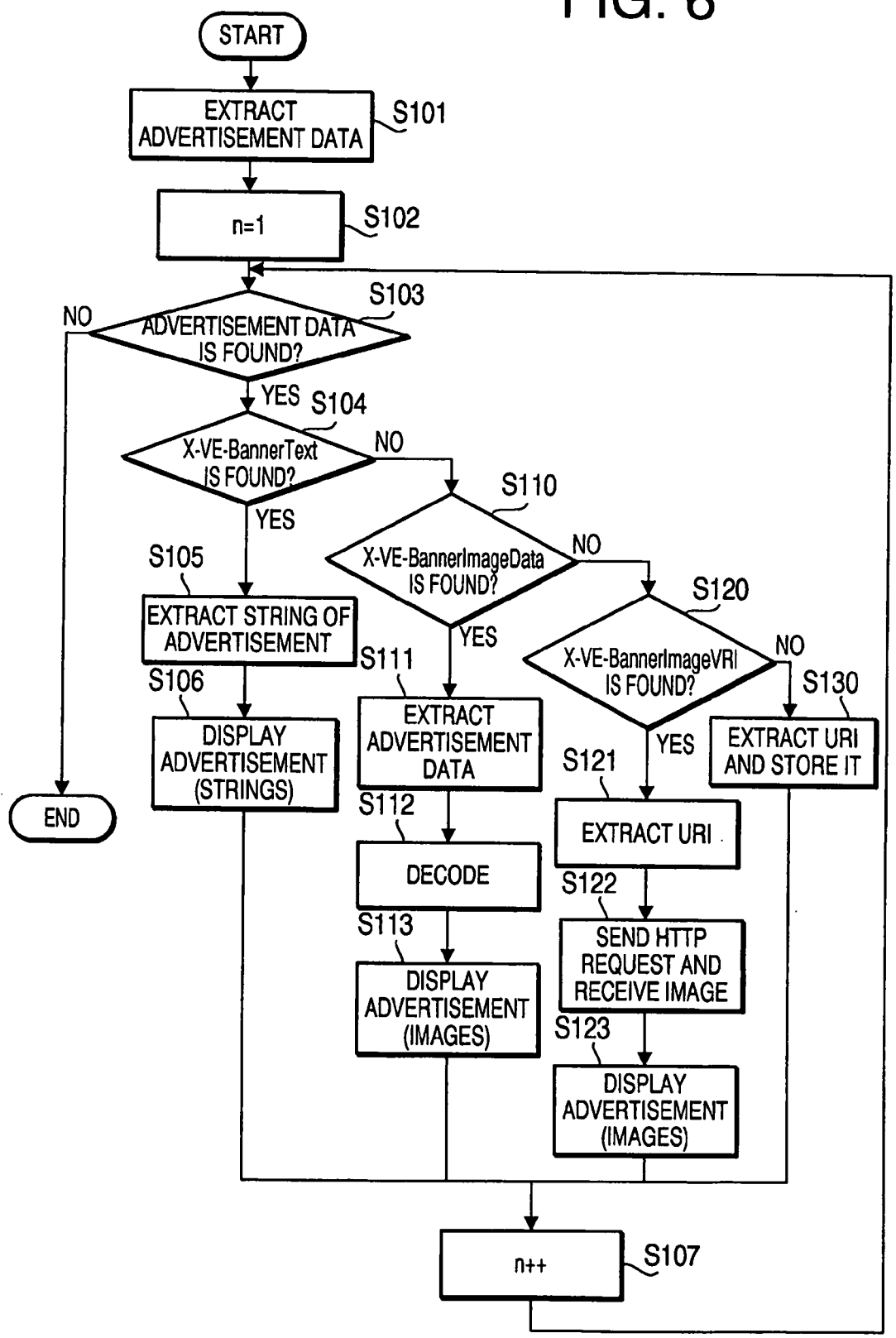
FIG. 6 shows a flow which is executed in the embodiment when an HTTP response message is received by the cellular phone.

FIG. 6 shows a flow which is executed when an HTTP response message is received by the cellular phone 300. At the start of the flow, step S101 is executed.

In the step S101, the cellular phone 300 extracts a line starting with "X-VE-BannerText", "X-VE-BannerImageData", "X-VE-BannerImageURI" or "X-VE-URI" from the entity header of the HTTP response message. The extracted advertisement data is text data extending for one or more lines. Subsequently, the process advances to step S102.

In the step S102, a variable n is set at 1. Subsequently, the process advances to step S103.

In the step S103, whether there exists advertisement data in the n-th line of the advertisement data extracted in the step S101 or not is judged. If there exists no advertisement data, that is, if the n-th line is an empty line (S103: NO), this routine is ended. If there exists advertisement data (S103: YES), the process advances to step S104.

In the step S104, whether the advertisement data in the n-th line starts with "X-VE-BannerText" or not is judged. If the advertisement data in the n-th line starts with "X-VE-BannerText", that is, if the line contains an advertisement that is expressed as a character string (S104: YES), the process advances to step S105.

In the step S105, the cellular phone 300 removes the identifier "X-VE-BannerText" and the following separator ":" from the advertisement data in the n-th line and thereby extracts the data part of the advertisement data. Subsequently, the process advances to step S106.

In the step S106, the cellular phone 300 displays the character string extracted in the step S105 in the advertisement character string display area 301b. When it is impossible to display the whole character string in the advertisement character string display area, the character string is forcibly scrolled from right to left. By the so-called marquee display, the user of the cellular phone is allowed to browse the whole character string of the advertisement. Subsequently, the process advances to step S107.

In the step S104, if the advertisement data in the n-th line starts with an identifier other than "X-VE-BannerText" (S104: NO), the process advances to step S110.

In the step S110, whether the advertisement data in the n-th line starts with "X-VE-BannerImageData" or not is judged. If the advertisement data in the n-th line starts with "X-VE-BannerImageData", that is, if the line contains a character string obtained by text-encoding image data (S110: YES), the process advances to step S111.

In the step S111, the cellular phone 300 removes the identifier "X-VE-BannerImageData" and the following separator ":" from the advertisement data in the n-th line and thereby extracts the data part of the advertisement data. Subsequently, the process advances to step S112.

In the step S112, the cellular phone 300 decodes the character string extracted in the step S111 into image data. Subsequently, the process advances to step S113.

In the step S113, the cellular phone 300 displays the image data obtained by the decoding of the step S112 in the advertisement image display area 301c. Subsequently, the process advances to the step S107.

In the step S110, if the advertisement data in the n-th line starts with an identifier other than "X-VE-BannerImageData", that is, if the advertisement data in the n-th line starts with "X-VE-BannerImageURI" or "X-VE-URI" (S110: NO), the process advances to step S120.

In the step S120, whether the advertisement data in the n-th line starts with "X-VE-BannerImageURI" or not is judged. If the advertisement data in the n-th line starts with "X-VE-BannerImageURI", that is, if the line contains a URI representing the position of image data (S120: YES), the process advances to step S121.

In the step S121, the cellular phone 300 removes the identifier "X-VE-BannerImageURI" and the following separator ":" from the advertisement data in the n-th line and thereby extracts the data part of the advertisement data (i.e. the URI). Subsequently, the process advances to step S122.

In the step S122, the cellular phone 300 generates an HTTP request message for acquiring an image specified by the URI extracted in the step S121, and transmits the HTTP request message to a base station 201. Subsequently, the cellular phone 300 waits until the image data specified by the URI is received from the base station 201. When the image data is received by the cellular phone 300, the process advances to step S123.

In the step S123, the cellular phone 300 displays the image data acquired in the step S122 in the advertisement image display area 301c. Subsequently, the process advances to the step S107.

In the step S120, if the advertisement data in the n-th line starts with an identifier other than "X-VE-BannerImageURI", that is, if the advertisement data in the n-th line starts with "X-VE-URI" (S120: NO), the process advances to step S130.

In the step S130, the cellular phone 300 removes the identifier "X-VE-URI" and the following separator ":" from the advertisement data in the n-th line and thereby extracts the data part of the advertisement data (i.e. a URI of a link). The linked URI is stored in an unshown memory of the cellular phone 300. Subsequently, the process advances to the step S107.

In the step S107, the variable n is incremented by 1. Subsequently, the process returns to the step S103.

By the flow explained above, the advertisement data is extracted from the entity header of the HTTP response message and a character string and/or image for advertisement are/is displayed in the advertisement character string display area 301b and/or the advertisement image display area 301c. Incidentally, the linked URI stored in the memory of the cellular phone 300 in the step S130 is used in a hyperlink operation which will be explained below.

Figure 7:
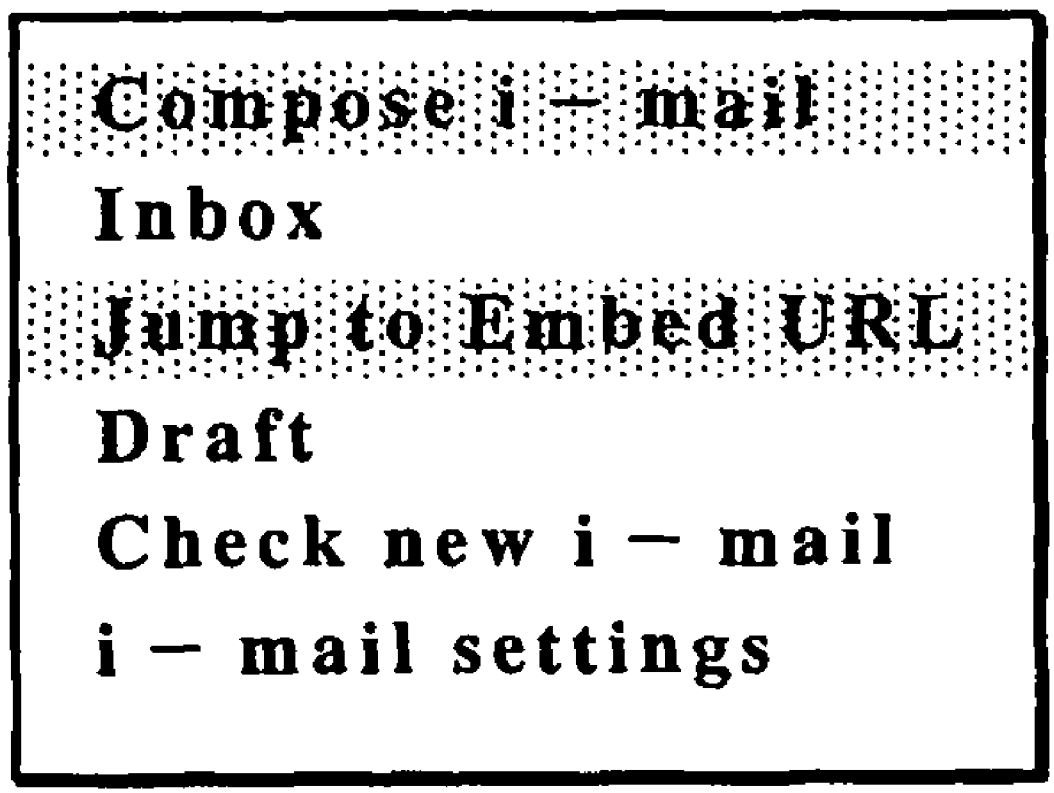
FIG. 7 shows an example of a menu displayed on the screen of the cellular phone 300.

When the menu display key 302c (FIG. 5) of the cellular phone 300 is pressed, a menu is displayed on the screen 301. An example of the menu is shown in FIG. 7. As shown in FIG. 7, a plurality of menu items are displayed on the menu. The user of the cellular phone 300 points at a desired menu item by operating the cross-shaped directional key 302a and then presses the execution key 302b, by which a process corresponding to the menu item is executed.

In this embodiment, the menu includes a menu item "Jump to Embedded URI" as shown in FIG. 7. When the user points at the menu item and presses the execution key 302b, the cellular phone 300 generates an HTTP request header for acquiring a resource at the linked URI obtained in the step S130 (FIG. 6) and transmits it to a base station 201. When the resource is acquired, the cellular phone 300 displays the acquired resource in the main display area 301a. By the above process, the user of the cellular phone 300 can refer to the details of the advertisement in the main display area 301a which has a larger display size.

While a case where advertisement data contained in an HTTP response message is displayed in a second display area (the advertisement character string display area 301b and/or the advertisement image display area 301c in the above embodiment) has been described above, the present invention is also applicable to cases where data other than advertisement data is displayed on the screen. Such data other than advertisement data can include data for notification from the cellular phone carrier to the user of the cellular phone (e.g. notification of trouble), for example.

Therefore, the present invention is characterized in that data contained in a part of the HTTP response message other than the message body corresponding to the resource previously stored in the content server (i.e. data added to the header part by a gateway server, etc.) is displayed in the second display area.

As described above, by the embodiment of the present invention, even when the user of the message display terminal scrolls content on the screen of the terminal in order to browse the content, the advertisement remains on the screen. Further, by the embodiment of the present invention, the administrator of a network (e.g. wireless packet communication network) can add an advertisement to a resource on a different network (e.g. the Internet) on his/her own. Furthermore, an advertisement can be added to a resource other than a hypertext document.

What is claimed is:

1. A gateway server which relays an HTTP request message sent from a terminal on a first network to a content server on a second network while relaying an HTTP response message sent from the content server to the terminal, the gateway server comprising:
  a request message receiving unit which receives the HTTP request message sent from the terminal;
  an identification information extracting unit which extracts identification information on the terminal from the HTTP request message, wherein the identification information identifies the terminal that sent the HTTP request message;
  an identification information storing unit which stores the extracted identification information;
  a request message transmitting unit which transmits the HTTP request message to the content server;
  an advertisement selecting unit which selects advertisement data to be added to a header part of the HTTP response message from multiple pieces of advertisement data, the selecting based on the identification information stored in the identification information storing unit; and
  a response message receiving unit which receives the HTTP response message from the content server,
  wherein the gateway server adds the selected advertisement data to the header part of the HTTP response message before sending the HTTP response message to the terminal, wherein the advertisement data includes advertising content to be displayed to a user of the terminal.

2. The gateway server according to claim 1, wherein the first network is a wireless packet communication network.

3. The gateway server according to claim 1, wherein the second network is the Internet.

4. The gateway server according to claim 1, wherein the advertisement selecting unit selects the advertisement data to be added to the header part of the HTTP response message by use of location information on the terminal contained in the HTTP request message.

5. The gateway server according to claim 4, wherein the location information is provided by a base station which relays the HTTP request message from the terminal to the gateway server while relaying the HTTP response message from the gateway server to the terminal.

6. The gateway server according to claim 1, wherein the advertisement selecting unit selects the advertisement data to be added to the header part of the HTTP response message by use of a URI of the HTTP request message.

7. The gateway server according to claim 1, wherein the advertisement selecting unit selects the advertisement data to be added to the header part of the HTTP response message by use of reception date/time of the HTTP request message and/or the HTTP response message.

8. The gateway server according to claim 1, wherein the advertisement selecting unit randomly selects the advertisement data to be added to the header part of the HTTP response message.

9. The gateway server according to claim 1, wherein the advertisement selecting unit selects the advertisement data to be added to the header part of the HTTP response message by use of a media type contained in the HTTP response message.

10. A non-transitory computer program product comprising computer readable instructions to be executed by a gateway server relaying an HTTP request message sent from a terminal on a first network to a content server on a second network while relaying an HTTP response message sent from the content server to the terminal, the instructions causing the gateway server to execute the function of:
receiving the HTTP request message sent from the terminal;
extracting identification information on the terminal from the HTTP request message, wherein the identification information identifies the terminal that sent the HTTP request message;
storing the extracted identification information;
transmitting the HTTP request message to the content server;
receiving the HTTP response message from the content server;
selecting advertisement data to be added to a header part of the HTTP response message from multiple pieces of advertisement data, the selecting based on the stored identification information; and
adding advertisement data to the header part of the HTTP response message before sending the HTTP response message to the terminal, wherein the advertisement data includes advertising content to be displayed to a user of the terminal.

11. The gateway server according to claim 1, wherein the identification information on the terminal is deleted from the HTTP request message before the request message transmitting unit transmits the HTTP request message to the content server.

12. A method for providing a message display terminal with advertisement data, the method including steps of:
receiving an HTTP request message sent from the terminal to a content server;
extracting identification information on the terminal from the HTTP request message, wherein the identification information identifies the terminal that sent the HTTP request message;
storing the extracted identification information;
transmitting the HTTP request message sent from the terminal;
receiving an HTTP response message from the content server;
selecting advertisement data to be added to a header part of the HTTP response message from multiple pieces of advertisement data, the selecting based on the stored identification information;
adding the selected advertisement data to the header part of the HTTP response message, wherein the advertisement data includes advertising content to be displayed to a user of the terminal, and
transmitting the HTTP response message to the terminal.

13. The method according to claim 12, wherein the relaying step further includes a step of deleting identification information on the terminal from the HTTP request message before the transmitting step in the relaying step transmits the HTTP request message to the content server.

14. An advertisement data providing server comprising:
a relaying unit which relays an HTTP request message sent from a terminal to a content server while relaying an HTTP response message sent from the content server to the terminal, the relaying unit comprising:
a request message receiving unit which receives the HTTP request message sent from the terminal;
an identification information extracting unit which extracts identification information on the terminal from the HTTP request message, wherein the identification information identifies the terminal that sent the HTTP request message;
an identification information storing unit which stores the extracted identification information;
a request message transmitting unit which transmits the HTTP request message to the content server; and
a response message receiving unit which receives the HTTP response message from the content server;
an advertisement selecting unit which selects advertisement data to be provided to the terminal from multiple pieces of advertisement data, wherein the advertisement selecting unit selects the advertisement data based on the identification information stored in the identification information storing unit, wherein the advertisement data includes advertising content to be displayed to a user of the terminal; and
an advertisement data adding unit which adds the selected advertisement data to a header part of the HTTP response message before sending the HTTP response message to the terminal.

15. The advertisement data providing server according to claim 14, wherein the identification information on the terminal is deleted from the HTTP request message before the request message transmitting unit transmits the HTTP request message to the content server.

16. An advertisement data providing system comprising a message display terminal and an advertisement data providing server,
the advertisement data providing server comprising:
a relaying unit which relays an HTTP request message sent from a terminal to a content server while relaying an HTTP response message sent from the content server to the terminal, the relaying unit comprising:
a request message receiving unit which receives the HTTP request message sent from the terminal;
an identification information extracting unit which extracts identification information on the terminal from the HTTP request message, wherein the identification information identifies the terminal that sent the HTTP request message;
an identification information storing unit which stores the extracted identification information;
a request message transmitting unit which transmits the HTTP request message to the content server; and
a response message receiving unit which receives the HTTP response message from the content server;
an advertisement selecting unit which selects advertisement data to be provided to the terminal from multiple pieces of advertisement data, wherein the advertisement selecting unit selects the advertisement data based on the identification information stored in the identification information storing unit, wherein the advertisement data includes advertising content to be displayed to a user of the terminal; and
an advertisement data adding unit which adds the selected advertisement data to a header part of the HTTP response message before sending the HTTP response message to the terminal, and the terminal comprising:

a receiving unit which receives the HTTP response message from the advertisement data providing server;

a first display area for displaying a message body of the HTTP response message;

a second display area for displaying other information; and a display controller which lets the second display area display the advertisement data contained in the header part of the HTTP response message.

* * * * *